United States Patent [19]

Heap et al.

[11] 4,231,106

[45] Oct. 28, 1980

[54] PERFORMANCE MONITOR APPARATUS AND METHOD

[75] Inventors: David L. Heap, Centerville; Allen L. Kenner, Magna, both of Utah

[73] Assignee: Sperry Rand Corporation, New York, N.Y.

[21] Appl. No.: 924,242

[22] Filed: Jul. 13, 1978

[51] Int. Cl.³ .............................................. G06F 9/00
[52] U.S. Cl. .................................... 364/900; 364/550
[58] Field of Search ........................ 364/900, 550, 551

[56] References Cited

U.S. PATENT DOCUMENTS

| | | | |
|---|---|---|---|
| 3,434,115 | 3/1969 | Chomicki | 364/900 |
| 3,935,563 | 1/1976 | Unger | 364/900 |
| 3,984,662 | 10/1976 | Sorenson | 364/900 |
| 3,990,049 | 11/1976 | Wirth | 364/900 |
| 3,990,053 | 11/1976 | Evans | 364/900 |
| 4,072,852 | 2/1978 | Hogan, et al. | 364/900 X |

*Primary Examiner*—Edward J. Wise
*Attorney, Agent, or Firm*—Thorpe, North & Gold

[57] ABSTRACT

Performance monitor apparatus is adapted to monitor various computer program events such as the length of time required to execute a particular program, the number of times a particular program or instruction sequence is executed during some predetermined period, etc. The apparatus includes a buffer for receiving an instruction data word from a data processor and for temporarily storing the data word, a register having a plurality of bistable elements each of which is adapted to produce either a first or second output signal in response to receipt of a first or second operation signal respectively and receipt of a select signal, a select logic circuit for applying a select signal to a particular bistable element identified by certain bits of the instruction data word stored in the buffer, and an operation logic circuit for supplying to the bistable elements either a first or second operation signal as determined by certain other bits of the instruction data word stored in the buffer. Each bistable element represents a different event or occurrence in a computer program being monitored and the signals produced by the bistable elements indicate the nature of the monitoring operation to be performed. The signals are supplied to timing and counting apparatus which then either measures the time over which the signals are produced or increments a count in response to receiving the signals.

14 Claims, 5 Drawing Figures

PERFORMANCE MONITOR APPARATUS AND METHOD

BACKGROUND OF THE INVENTION

This invention relates to a method and apparatus for monitoring computer program events or actions as such events or actions are carried out on a data processor.

In evaluating and optimizing computer programs, it is desirable to obtain information as to the actual execution of the program such as, for example, information about the time required for executing different parts of the program, the number of times different parts of the program are executed over a given period of time, etc. One method of doing this is to provide for a type of self-monitoring in which the programs being monitored are modified to include instructions which enable the data processor to generate and maintain information regarding the execution of the programs. The result of this, of course, is that additional software is required and the time required for executing the computer programs is increased.

There are arrangements which attempt to reduce the amount of additional software necessary for monitoring software events, one such arrangement being the use of apparatus such as the so-called Dynaprobe-7900 and Dynaprobe-7720, both produced by Comten, Inc. With this apparatus, the monitoring is carried out with respect to the locations in memory in which the computer programs being monitored are identified by the locations in memory in which the instructions affecting such events or actions are stored, and the accessing of the memory to obtain such instructions is monitored by the mentioned equipment. As long as the programs being monitored are maintained in the same locations in memory, this arrangement is suitable at least for certain types of monitoring. However, if the system in question is a "non-resident" system in which the programs may be put in different locations in memory from one processing run to another, then the arrangement is unsuitable simply because there is no way to know where the different programs are stored and thus what events are being monitored.

SUMMARY OF THE INVENTION

It is an object of the invention to provide a new and improved method and apparatus for monitoring software actions and events.

It is another object of the invention to provide such a method and apparatus in which the impact on the computer programs being monitored is substantially minimized.

It is a further object of the invention to provide such a method and apparatus in which a plurality of different software events or actions may be monitored at the same time.

It is an additional object of the invention to provide such a method and apparatus which is capable of monitoring software events and actions regardless of the memory locations where such software is stored.

The above and other objects of the invention are realized in an illustrative method and apparatus for monitoring events or actions which occur in the course of executing a computer program on a data processor. Monitor instructions are included in the computer program at predetermined locations therein, with these instructions including address data and operation data. When the monitor instructions are encountered in the course of executing the computer program, the address data and operation data are applied to a buffer where such data are temporarily stored. In response to this, signal producing apparatus produces a certain signal specified by the operation data on one of a plurality of output terminals specified by the address data. The signal produced is then supplied to timing and counting apparatus, for example, to either measure over the time during which the signal is supplied, or to increment a count upon supplication of the signal.

In this manner, particular software events, represented by the different output terminals of the signal producing apparatus, are monitored in accordance with the type of signals produced on the terminals. The only impact on the computer program is that monitor instructions are provided at predetermined locations therein to, in effect, "call into play" the monitoring operation. The monitor instructions include data for identifying the activity being monitored and data for identifying the type of monitoring operation to be performed.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
FIG. 1 is a block diagram showing of a performance monitor, made in accordance with the principles of the present invention, as it would be used for monitoring software events being carried out on a data processor.

FIG. 1 shows a block diagram arrangement of a performance monitor 4 coupled to a conventional data processor 8 and also to timing and counting apparatus 12. The data processor 8 could be any of a variety of conventional computers such as the Sperry Univac 3760 computer. The timing and counting apparatus 12 could be any of a variety of conventional monitors such as the Dynaprobe-7900 monitor, previously mentioned, which is capable of measuring the time over which different signals are supplied to the apparatus and also capable of counting pulses received by the apparatus. The performance monitor 4 is constructed in accordance with the present invention to receive information, in the form of monitor instructions, from the data processor 8 and then to supply appropriate signals to the timing and counting apparatus 12 so that the latter apparatus can produce a record of the occurrence of various software events or actions in the data processor 8.

Figure 2:
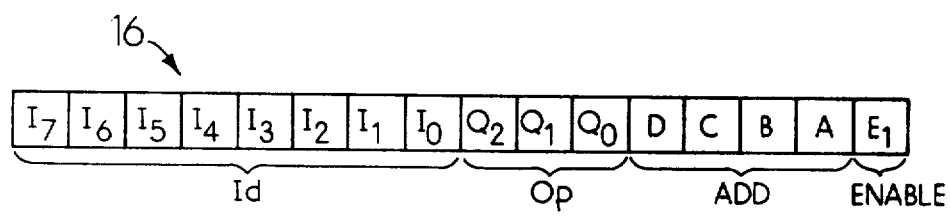
FIG. 2 is a diagrammatic representation of a monitor instruction suitable for use with the present invention.

The computer programs executed on the data processor 8 are adapted to include special monitor instructions located throughout the program which, when encountered by the data processor 8, would cause the initiation of the monitoring operation. The monitor instructions each consists of a data word, such as shown at 16 in FIG. 2, which includes an identification field (Id) consisting of, for example, eight bits $I_0, \ldots, I_7$, an operation field (Op) consisting of three bits $Q_0$, $Q_1$, and $Q_2$, an address field (Add) consisting of four bits A, B, C and D, and an enable field (Enable) consisting of one bit. The identification field Id consists of a unique code used solely for monitoring purposes. That is, such code will not appear in the position shown in the data word 16 of FIG. 2 for any other instruction in any computer program processed by the data processor 8 (FIG. 1). The last eight bits of each instruction (such as those representing the Op field, Add field and Enable field of the instruction of FIG. 2) are applied to the performance monitor, but no action is taken by the monitor unless signaled by the data processor. When the unique identification code is encountered by the data processor, the processor generates and applies a triggering signal to the performance monitor to cause the monitor to initiate the monitoring operation.

The operation code Op of the monitor instruction 16 (FIG. 2) specifies what action the performance monitor 4 (FIG. 1) is to take in response to receipt of the instruction. Such actions can, in effect, be the measuring of the time interval over which a computer program or portion of a program is being executed, the counting of the number of times a program or subroutine is executed over some period of time, etc. The action to be taken is specified by the type of signal produced by the performance monitor 4 and applied to the timing and counting apparatus 12.

The address field Add of the monitor instruction 16 is used to identify what action or event in the computer program is to be monitored. The address field identifies a particular one of a plurality of output leads of the performance monitor 4 which is to carry the "operation" signal produced by the performance monitor 4. These output leads each represent a different software event being monitored.

It should be understood that the number of bits in each field of the monitor instruction 16 can be selected according to the desires and needs of the user so long as such length is consistent with the processing capabilities of the data processor 8.

Figure 3:
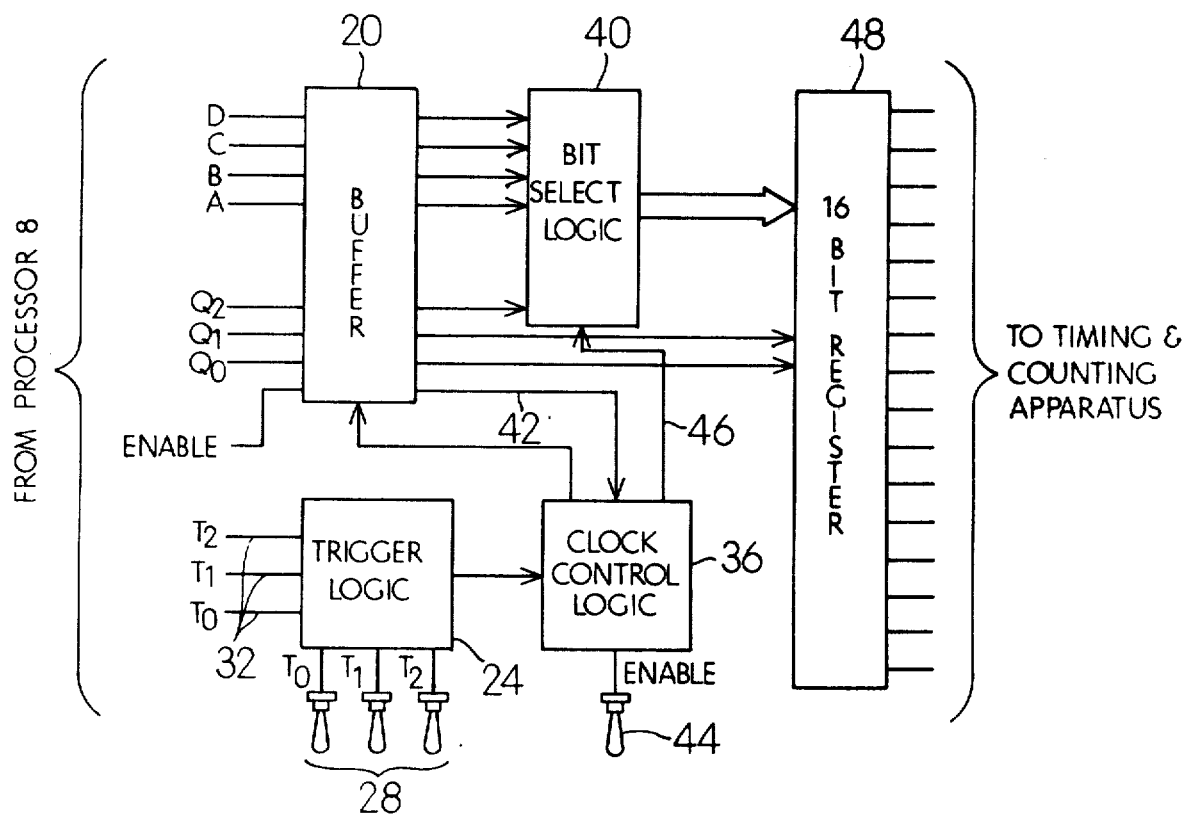
FIG. 3 is a block diagram schematic of the performance monitor of FIG. 1.

A specific embodiment of the performance monitor 4 of FIG. 1 is shown in FIG. 3 to include a buffer 20 for receiving and temporarily storing the operation field bits, the address field bits and the enable bit of monitor instructions received from the data processor 8. Also included is a trigger logic circuit 24 which receives trigger bits $T_0$, $T_1$, and $T_2$ generated by the data processor when the unique identification code of a monitor instruction is encountered. Coupled to the trigger logic 24 are three toggle switches 28, or similar switches, which are manually settable to identify a bit pattern to which the trigger logic 24 will respond. That is, the trigger bits $T_0$, $T_1$, $T_2$ will cause the trigger logic circuit 24 to produce an output signal only if they "match" the settings of the three toggle switches 28. Each of the toggle switches corresponds to a different one of inputs 32 from the data processor and the setting of each switch is compared to the input on the corresponding input to determine if "true" trigger bits are received.

Illustratively, the toggle switches 28 could be three position switches having a "high" setting, a "don't care" setting, and a "low" setting. When a switch is set in the "high" setting, then the corresponding one of inputs 32 must be high in order for the trigger logic circuit 24 to "trigger". When a switch is set in the "low", then the corresponding one of the inputs 32 must be low in order to "trigger" the trigger logic circuit 24. Finally, when a switch is in the "don't care" setting, then either a high or low signal on the corresponding one of inputs 32 will cause the trigger logic circuit 24 to "trigger" and produce a trigger output signal.

As is evident from the above discussion, the trigger logic circuit 24 is utilized to detect receipt of a monitor instruction and to produce an output signal to initiate operation of the performance monitor. Unless a match occurs between the settings of the toggle switches 28 and the signals received over inputs 32, no action by the performance monitor of FIG. 3 will be taken. Provision of the toggle switches 28 gives the user flexibility in selecting the identification code to which the performance monitor will respond.

Also included in the FIG. 3 embodiment is a clock control logic circuit 36 which, in response to a signal from the trigger logic circuit 24, strobes the buffer 20 to cause the buffer to store the address field bits, operation field bits and enable bit being supplied by the data processor. A three-position toggle switch 44, similar to the switches 28, is coupled to the clock control logic circuit 36, and the setting of this switch is compared by the circuit 36 with the enable bit received from the data processor and strobed into the buffer 20 (along with the address field and operation field bits). If the setting of the switch 44 "matches" the enable bit stored in the buffer 20 and applied to the circuit 36 via lead 42 (i.e., both "high", both "low", or the switch 44 placed in the "don't care" position), then the circuit 36 signals the bit select logic 40 via lead 46 to cause the logic to execute the received monitor instruction.

The "enable" switch 44 is useful to provide further control of which monitor instructions will cause initiation of the monitoring operation. For example, it may be desirable to cause one performance monitor to initiate the monitoring operation when the enable bit or signal is high, another to initiate monitoring when the enable bit or signal is low, and perhaps a third to initiate monitoring when the bit or signal is either high or low.

The bit select logic circuit 40 responds to the address field bits A, B, C and D received from the buffer 20 by enabling a particular one of sixteen bistable elements included in a sixteen bit register 48. In effect, the bit select logic circuit 40 selects a particular one of the elements, each of which, in turn, represents a different action or event in the computer program being monitored. These bistable elements produce certain signals depending upon the values of the bits $Q_0$ and $Q_1$ applied by the buffer 20 to the register 48. The operation of the embodiment of FIG. 3 will now be briefly described in conjunction with an exemplary processing operation diagrammatically represented in FIG. 4.

Figure 4:
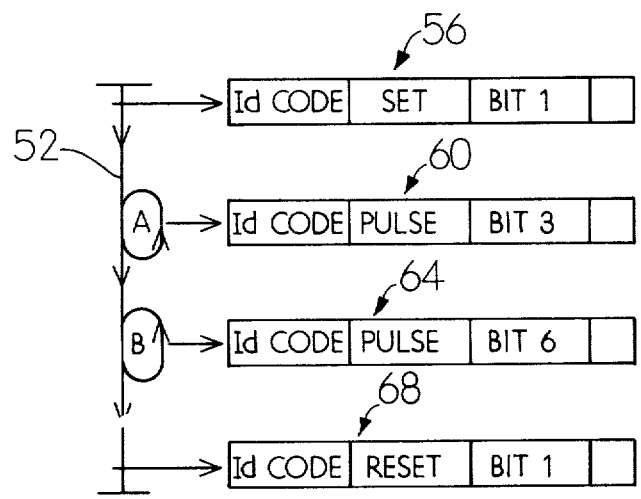
FIG. 4 is a diagrammatic representation of the execution of a computer program, which includes monitor instructions, in accordance with the present invention.

Computer programs consist of sequences of instructions which direct a computer or data processor to take certain actions as the instructions are "processed". The vertical line 52 of FIG. 4 diagrammatically represents the execution of a sequence of instructions of a computer program by the data processor 8. This program includes instructions which "call" for the execution of two subroutines A and B, illustrated by loops in FIG. 4. At or near the first of the program represented in FIG. 4 is a monitor instruction 56 whose operation field indicates that the operation to be carried out is that a certain bistable element or bit is to be "set"; the address field of this instruction identifies this element or bit as "bit 1". As the program is processed, the monitor instruction 56 is detected and appropriate trigger bits supplied to the performance monitor of FIG. 3 which compares these bits with the setting of the toggle switches 28. Since a "match" would occur, the trigger logic circuit would produce an output signal which is applied to the clock control logic circuit 36. In response to this signal, the clock control logic circuit 36 strobes the buffer 20 to cause storage of the address field bits, operation field bits and enable bit of the monitor instruction 56. A "match" between the enable bit and the setting of switch 44 results in the logic circuit 36 signalling the bit select logic circuit 40 to perform its "select" function. The bit select logic circuit 40 "decodes" the address bits stored in the buffer 20 to ascertain that the selected element is "bit 1", and signals bistable element 1 of the register 48. This signal, together with the "set" signal represented by the operation code bits $Q_0$, $Q_1$, and $Q_2$ result in bistable element 1 being placed in a "set" condition. In this condition, the bistable element 1 supplies a signal over a corresponding one of the output leads of the sixteen bit register 48 to timing and counting apparatus 12 (FIG. 1). The setting of the bistable element 1 and the resulting production of a signal on a corresponding output lead causes a timer in the timing and counting apparatus 12 to begin to time. This timer is associated only with the output lead of bistable element 1.

Following application of the monitor instruction 56 to the performance monitor of FIG. 3, the data processor 8 (FIG. 1) continues to execute the computer program 52 (FIG. 4) in its normal processing operation. Portions of the instructions executed by the data processor may be supplied to the performance monitor of FIG. 3, but since such instructions would not contain the proper identification code, no trigger bits would be supplied to the performance monitor and the monitor would take no action.

At some point in the execution of the program of FIG. 4, subroutine A is called and the data processor commences to execute the subroutine. Included in the subroutine is a monitor instruction 60 whose operation field bits indicate that a signal "pulse" is to be produced by bistable element No. 3 of the register 48 (FIG. 3), which is identified by the address field bits. The address field bits, etc., of monitor instruction are applied to and processed by the performance monitor of FIG. 3 in the same manner as described earlier for the monitor instruction 56. In this case, however, the operation code bits indicate that bistable element 3 is to produce a pulse which will be applied to the timing and counting apparatus to increment a counter associated with the output lead of the register 48 upon which the pulse is produced.

After executing subroutine A, the data processor 8 continues with the main program until subroutine B is encountered, at which time the data processor commences to execute this subroutine. Located in subroutine B is a monitor instruction 64 which causes the performance monitor of FIG. 3 to produce a "pulse" on an output lead associated with bistable element 6 of the register 48. This pulse is applied to the timing and counting apparatus to cause the incrementation of another counter associated with this output lead. The counters which count the pulses applied to output leads of bistable elements 3 and 6 maintain a count of the number of times that subroutines A and B respectively are executed. In this manner, the timing and counting apparatus produces a record of the number of times these subroutines are performed by the data processor 8 over some selected period of time.

After completion of the execution of subroutine B, the data processor 8 continues with the main program 52 until a monitor instruction 68, at or near the end of the program, is encountered. The address bits, etc., of this monitor instruction are applied to the performance monitor of FIG. 3 to cause bistable element 1 to be reset. Such resetting of the bistable element, causes the associated timer of the timing and counting apparatus 12 to terminate the timing operation begun when bistable element 1 was set pursuant to monitor instruction 56. The setting of the bistable element 1 at the beginning of execution of computer program 52 and then the resetting of the bistable element at the end of execution of computer program respectively initiates and terminates the timing operation so that a measure of the time it takes to execute the program of FIG. 4 can be obtained. The time it takes to execute other programs can also be measured in a similar fashion by associating a different one of the bistable elements of the register 48 with each such program.

Although specific operations such as timing and counting were discussed in conjunction with FIG. 4, it should be understood that other type operations, such as turning on, turning off or otherwise controlling other apparatus could also be provided for the performance monitor apparatus. The sixteen bit register 48 allows for the monitoring of sixteen different events or actions by the apparatus such as timing for different programs, counting the number of times different programs or subroutines are performed, controlling operation of other units, etc.

Figure 5:
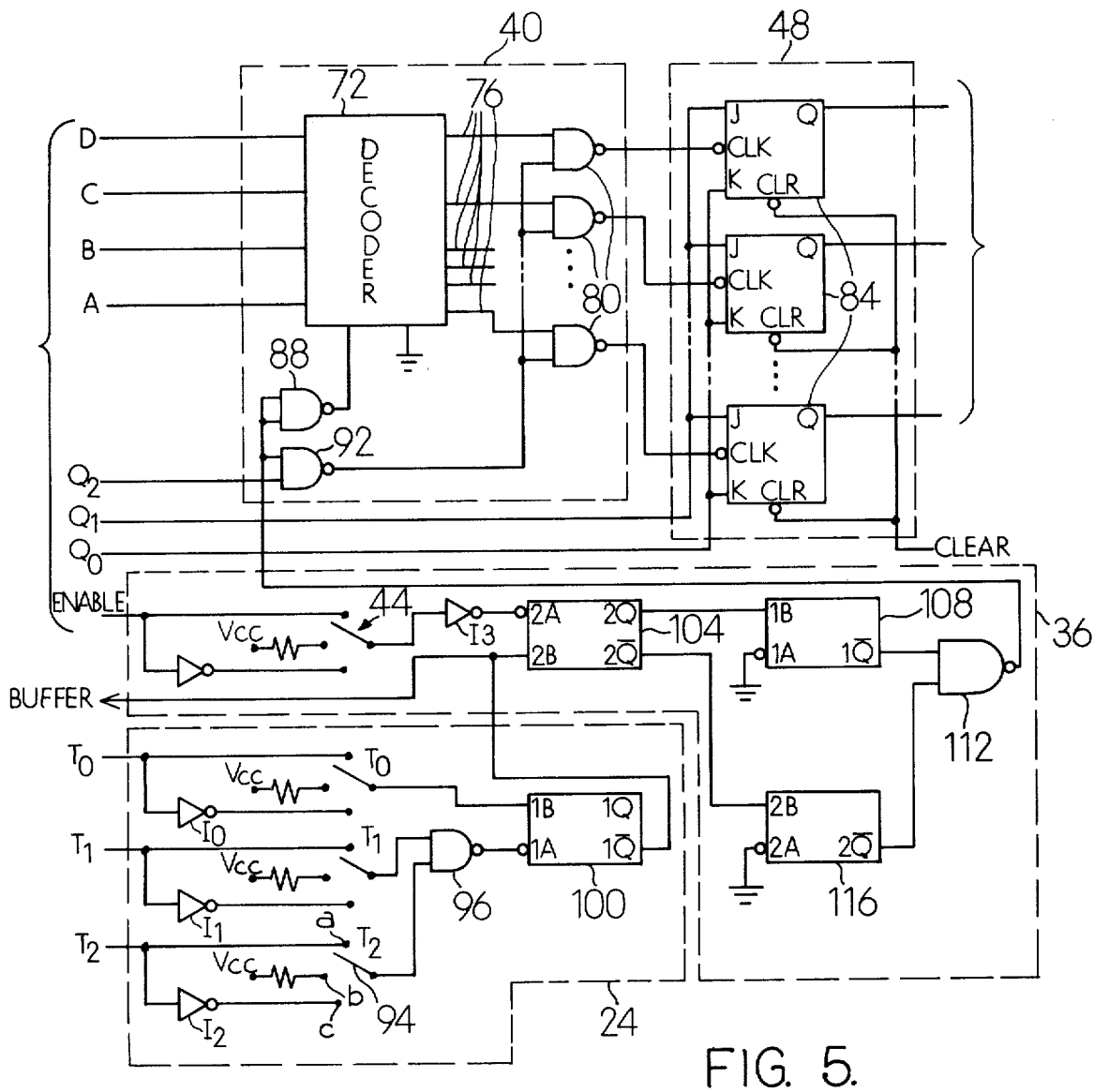
FIG. 5 is a more detailed embodiment of a portion of the performance monitor of FIG. 3.

FIG. 5 shows a specific illustrative embodiment of the bit select logic 40, the sixteen bit register 48, the trigger logic 24, and the clock control logic 36 of FIG. 3. The bit select logic 40 includes a decoder 72 for receiving the address bits of a monitor instruction and for producing a "low" output signal on a particular one of output leads 76 identified by the received address bits. Of course, with four address bits, sixteen different bit combinations are possible so that each combination of address bits can be used to identify a different one of the leads 76. Each of the leads 76 are coupled to a different one of NAND gates 80 which, in turn, are each coupled to a different one of a plurality of JK flip-flops 84 of the sixteen bit register 48.

The bit select logic 40 also includes NAND gates 88 and 92 whose outputs are connected respectively to the decoder 72 and to second input terminals of the NAND gates 80. NAND gate 88 is enabled by a "high" clock signal consisting of two "high" pulses from clock control logic 36 to provide a low signal to the decoder 72 to cause the decoder to "decode" the four address bits and produce an output signal on a selected one of the output leads 76. NAND gate 92 is enabled when both operation code bits $Q_2$ is "high" and a "high" signal is received from the clock control logic circuit 36. The NAND gate 92 then applies a "low" signal to all of the NAND gates 80 to cause the NAND gates to produce "high" pulses which are applied to the clock input terminals of the JK flip-flops 84. The bit select logic 40 thus operates to either clock a particular JK flip-flop identified by the address bits A, B, C and D, or all of the JK flip-flops when the operation code bit $Q_2$ is high.

The JK flip-flop is a well known bistable element having a J input, and K input, a clock input, a clear input, and a Q output. When the flip-flop receives a "low" signal on both the J and the K inputs, upon receipt of a clock pulse, the flip-flop produces a "low" output signal. When a "high" signal is received on the J input and a "low" signal is received on the K input, upon receipt of a clock pulse, the flip-flop produces a "high" output signal. Finally, when "high" signals are received on both the J and K inputs, upon receipt of a clock pulse, the flip-flop produces the opposite signal which it was producing just prior to receipt of a clock pulse. The JK flip-flop thus provides a useful register element for producing signals for application to the timing and counting apparatus.

The trigger logic 24 of FIG. 5 includes the three switches T₀, T₁ and T₂ mentioned earlier. Each switch includes three stationary terminals a, b and c as shown, for example, for switch T₂. Terminal a is coupled directly to a corresponding input lead from the data processor such as lead T₀, T₁, or T₂. Terminal b is coupled via a resistor to a voltage source, and terminal c is coupled via an inverter, such as I₂, to a corresponding input lead from the data processor. Each switch also includes a movable element, such as element 94, which may be moved to contact any of the corresponding stationary terminals a, b or c. Setting the movable element 94 to contact terminal "a" corresponds to the "high" setting described earlier. Setting the movable element 94 to contact terminal "b" corresponds to the "don't care" setting, and setting the movable element to contact terminal "c" corresponds to the "low" setting described earlier.

Switch T₀ is coupled to a one-shot multivibrator 100 whereas switches T₁ and T₂ are coupled to a NAND gate 96 which, in turn, is coupled to an inverting input of the one-shot mulivibrator. When the trigger signals received from data processor are valid, i.e., "true", then the multivibrator 100 produces a "low" output signal which is applied both to the clock control logic 36 and to the buffer 20 to enable the buffer to register data being applied thereto by the data processor.

The clock control logic 36 includes an ENABLE switch 44 having a construction similar to the switches of the trigger logic 24. The ENABLE switch 44 is coupled via an inverter I₃ to an inverting input of a one-shot multivibrator 104. The other input of the multivibrator 104 is coupled to the output of the one-shot multivibrator 100 of the trigger logic 24. One output (2Q) of the multivibrator 104 is connected to an input (1B) of another one-shot multivibrator 108. The other output (2$\overline{Q}$) of the multivibrator 104 is coupled to an input (2B) of still another one-shot multivibrator 116. The other inputs of the multivibrators 108 and 116 are coupled via an inverting element to ground potential. The outputs (1$\overline{Q}$ and 2$\overline{Q}$) of the multivibrators 108 and 116 respectively are coupled to a NAND gate 112 whose output is coupled to the inputs of NAND gate 88 and to one input of NAND gate 92.

The clock control logic circuit 36 produces a clock signal consisting of two clock pulses in response to receipt of an enable signal and the appropriate setting of the ENABLE switch 44. The two clock pulses are applied to the bit select logic 40 which, in turn, directs the pulses to the selected flip-flop of register 48. A brief operating description will now be given of the clock control logic circuit 36.

Assume that a trigger signal has been received and correctly detected, a "low" signal produced by the multivibrator 100 and applied to the buffer, and a "high" or "one" enable signal registered in the buffer. When the output of the multivibrator 100 changes from the "low" condition to a "high" condition, the multivibrator 104 responds to this and to receipt of the enable bit by producing a "high" signal on output 2Q and a "low" signal on output 2$\overline{Q}$. The "high" signal from output 2Q causes the multivibrator 108 to produce a "low" signal on its output and this, in turn, causes NAND gate 112 to produce a "high" output signal. This "high" signal persists so long as the multivibrator 108 is producing its "low" output. Ultimately, this "low" output changes to a "high" output so that NAND gate 112 changes from producing the "high" output to producing a "low" output. This constitutes the first pulse produced by the clock control logic 36.

The "low" signal produced on the 2$\overline{Q}$ output of the multivibrator 104 causes nothing to happen until it changes to a "high" signal (when the multivibrator reverts to its stable state) at which time it causes the multivibrator 116 to produce a "low" signal to thereby cause NAND gate 112 to again produce a "high" output. This "high" output persists so long as the multivibrator 116 is producing its "low" output afterwhich the output of NAND gate 112 goes "low". This constitutes the second pulse produced by the clock control logic 36. The separation between the two pulses is determined by the time duration over which multivibrator 104 is enabled to produce its "high" output on output line 2Q and its "low" on output line 2$\overline{Q}$.

The separation of the two pulses produced by the clock control logic 36 also determines the pulse width of pulses produced by the JK flip flops when the flip flops are directed to produce pulses. This is evident from a circuitry shown in FIG. 5 and described earlier.

In the manner described, monitor apparatus is provided for monitoring the execution of computer programs. With the particular embodiments described, up to sixteen events or activities carried out in the course of executing the program can be monitored and up to four different monitoring operations can be specified by the operation code bits. With this arrangement, very little impact is made upon the existing software and the monitoring operation is independent of the location of the software in the memory.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. Performance monitor apparatus for receiving instruction data words and for developing various output signals in response thereto, said instruction data words including address bits and operation bits, said apparatus including
    buffer means for receiving and temporarily registering an instruction data word,
    register means comprising a plurality of bistable elements, each for producing either a first or second output signal in response to receipt of a first or second operation signal respectively and receipt of a select signal,
    select logic means for applying a select signal to a particular bistable element identified by the address bits of the instruction data word registered in said buffer means, and means for supplying to said bistable elements either a first or second operation signal as determined by the operation bits of the instruction data word registered in said buffer means.

2. Performance monitor apparatus as in claim 1 further comprising trigger logic means responsive to receipt of a predetermined trigger signal for enabling said buffer means to receive and register said instruction data word.

3. Performance monitor apparatus as in claim 2 wherein said trigger logic means includes
manually settable switch means which may be set to represent various signal values, and means for enabling said buffer means when the value of said trigger signal matches the value set by said switch means.

4. Performance monitor apparatus as in claim 3 wherein said manually settable switch means may be set to enable said buffer means regardless of the value of said trigger signal.

5. Performance monitor apparatus as in claim 1 wherein said buffer means comprises a multiplicity of address cells and operation cells for temporarily storing the address bits and operation bits respectively of an instruction data word, wherein each of said bistable elements comprises a flip-flop having first, second and third inputs, and an output, each of said flip-flops being adapted to produce a first output signal upon receipt of both a first combination of operation signals on said first and third inputs and a select signal on said second input, and to produce a second output signal upon receipt of both a second combination of operation signals on said first and third inputs and a select signal on said second input, and wherein said select logic means comprises
decoding means for decoding the address bits stored in said address cells and for applying a select signal to the second input of a particular one of said flip-flops identified by the address bits, and
means for applying the contents of a first one of said operation cells to said first inputs of the flip-flops and for applying the contents of a second one of said operation cells to said third inputs of the flip-flops.

6. Performance monitor apparatus as in claim 5 wherein said select logic means further comprises logic circuitry responsive to a third one of said operation cells containing a certain bit for applying select signals to the second input of all of said bistable means.

7. Performance monitor apparatus as in claim 5 wherein each of said flip-flops comprise a JK flip-flop in which said first input is the J input, said second input is the clock input, and said third input is the K input.

8. Performance monitor apparatus as in claim 1 wherein said instruction data words include an enable bit, said apparatus further including enable logic means responsive to the storage of an enable bit in said buffer means for enabling said select logic means to apply a select signal to a selected bistable element.

9. A method of monitoring events which occur in the course of executing a computer program on a data processor comprising
providing monitor instructions in such computer program at predetermined locations therein, said instructions including address data and operation data,
applying the address data and operation data of a monitor instruction to performance monitor apparatus for temporary storage therein when such instruction is encountered by the data processor in the course of executing the computer program,
producing a certain signal specified by said operation data on one of a plurality of output terminals specified by said address data, and
supplying said certain signal to timing and counting apparatus to either measure over the time said certain signal is supplied or to increment a count upon supplication of the certain signal.

10. A method as in claim 9 wherein said monitor instructions include an identifying code which is different from identifying codes of other instructions executed by the data processor.

11. A method as in claim 9 wherein said monitor instructions include at least three operation bits, two of which specify the signal to be produced in the producing step and the other of which specifies whether the signal is to be produced on all the output terminals or only on said one terminal.

12. A method as in clain 9 wherein said applying step includes applying triggering signals to the performance monitor apparatus to enable temporary storage of the address data and operation data in the apparatus.

13. A method as in claim 12 wherein said applying step further includes comparing the triggering signals with the setting of a manually settable switch, and enabling temporary storage of the address data and operation data when the triggering signals match the switch setting.

14. A method as in claim 9 wherein said producing step includes producing said certain signal on all of said output terminals when certain operation data is applied to the performance monitor register.

* * * * *